United States Patent [19]

Echigo et al.

[11] Patent Number: 5,188,574
[45] Date of Patent: Feb. 23, 1993

[54] POWER TRAIN FOR AUTOMOTIVE VEHICLE

[75] Inventors: Mitsuji Echigo; Naomune Moriyama, both of Yokohama; Hideaki Akahoshi, Hiroshima; Osamu Kameda, Hiroshima; Hitoshi Akutagawa, Hiroshima, all of Japan

[73] Assignee: Mazda Motor Corporation, Hiroshima, Japan

[21] Appl. No.: 712,887

[22] Filed: Jun. 12, 1991

[30] Foreign Application Priority Data

Jun. 12, 1990 [JP] Japan ................... 2-153109
Jun. 12, 1990 [JP] Japan ................... 2-153110
Feb. 1, 1991 [JP] Japan ................... 3-012223

[51] Int. Cl.⁵ ............................ B60K 17/344
[52] U.S. Cl. .................... 475/206; 180/375; 180/297; 475/200; 475/202; 475/221
[58] Field of Search ............ 180/297, 374, 375, 376; 475/198, 200, 202, 206, 221, 222

[56] References Cited

U.S. PATENT DOCUMENTS

| 4,428,452 | 1/1984 | Muraoka et al. | 475/206 X |
| 5,071,396 | 12/1991 | Kobayashi | 475/221 X |
| 5,078,229 | 1/1992 | Kikuchi et al. | 180/297 X |

FOREIGN PATENT DOCUMENTS

| 804402 | 4/1951 | Fed. Rep. of Germany | 475/200 |
| 56-31824 | 3/1981 | Japan. | |
| 63-23219 | 1/1988 | Japan. | |
| 1-16690 | 3/1989 | Japan. | |
| 1-316559 | 12/1989 | Japan. | |

Primary Examiner—Richard Lorence
Assistant Examiner—William O. Trousdell
Attorney, Agent, or Firm—Keck, Mahin & Cate

[57] ABSTRACT

A power train includes a transmission disposed in a transverse direction of a vehicle, in which an engine crankshaft extends. The power train has a wheel drive shaft, disposed in alignment with a transmission shaft, a front differential, having differential output shafts aligned with the transmission shaft, and a speed reduction gear, disposed between the transmission shaft and differential input shaft. The speed reduction gear has an input gear, having an axis of rotation placed parallel to the transmission shaft. The transmission shaft is one of input shaft and output shaft, having axes of rotation which are placed parallel to the engine crankshaft. The wheel drive shaft and differential output shaft are aligned with the one of the transmission input and output shafts. The speed reduction gear, connected to the one of the transmission input and output shafts, is preferably parallel to both of the transmission input and output shafts.

28 Claims, 8 Drawing Sheets

POWER TRAIN FOR AUTOMOTIVE VEHICLE

The present invention relates to a power train for an automotive vehicle and, more particularly, to an automobile power train having a transmission with a transmission shaft in parallel with a crankshaft of a transversely mounted, i.e., "transverse" engine.

BACKGROUND OF THE INVENTION

1. Field of the Invention

In order to mount a transmission in front engine, front drive vehicles and four wheel drive vehicles so that the transmission is properly received in an engine volume or room, it is typical to place such a transmission and a transverse engine end to end, and to orient them both in a transverse direction of the vehicle body. In such an arrangement, the transmission is typically disposed along a line extending from an engine output shaft and in front of a front wheel drive shaft extending in a lengthwise direction of the car body.

2. Description of Related Art

For reducing an offset of the vehicle center of gravity toward the front wheels, so as to improve stability during steering and braking, it is effective to place a transverse engine and a transmission behind the front wheel drive shaft. Such a construction is described in, for example, Japanese Unexamined Patent Publication No.63(1988)-23219. Alternatively, a transmission, coupled to a transverse engine by means of a gear train, may be placed in front of the engine, above a front differential incorporated in the front wheel drive shaft, so as to transmit power to the front differential from the transmission through a transmission gear train. This type of construction is described in, for example, Japanese Unexamined Patent Publication No.56(1981)-31824. This type of transmission, which may be either manual or automatic, has input and output shafts, arranged in parallel with each other, which mount various elements for shifting speeds, or "speed shift means," thereon.

Transmission shafts, such as input and output shafts, on which the speed shift means is mounted, are disposed separately from the front differential incorporated in the front wheel drive shaft, and extend either in a lengthwise or a vertical direction of the vehicle body. Such a power train lay out requires a large space in order to be installed in the engine room, resulting in car bodies having a long nose and/or a high bonnet.

It is essential for compact cars to have a power train, including a transmission, front differential and front wheel differential, which is compact in arrangement and simple in structure. It is also essential for a compact, sophisticated power train to be provided with speed reduction means having a high speed reduction ratio.

In order for a power train to be compact in arrangement, it is effective to use a hollow transmission shaft that a front wheel drive shaft can be passed through the hollow transmission shaft. However, since a flex joint, incorporated in the front wheel drive shaft between a front differential and a front wheel, is offset towards the front wheel from the transmission, the part of the front wheel drive shaft between the flex joint and the front wheel is short in length. As is well recognized in the art, it is difficult for a short drive shaft between a flex joint and a front wheel to satisfactorily transmit an engine output to the front wheels when the wheels bump and rebound.

SUMMARY OF THE INVENTION

The primary object of the present invention is to provide a power train for use with a transverse engine which is compact in size and simple in structure.

Another object of the present invention is to provide a power train for use with a transverse engine which provides a sufficient speed reduction ratio between a transmission and a differential.

Still another object of the present invention is to provide a power train for use with a transverse engine which has a front wheel drive shaft sufficiently great in length between a flex joint and a front wheel to allow improved operation.

According to the present invention, the power train includes a transmission having transmission shafts, with an axis of rotation parallel to a crankshaft of an engine, extending in a transverse direction of a vehicle, at least one wheel drive shaft connected to each drive wheel, a front wheel differential for differentially driving the drive wheels through the wheel drive shaft, and speed reduction gear means for reducing a speed of rotation of the differential input shaft in relation to a speed of rotation of the transmission shafts.

The wheel drive shaft has a axis of rotation in alignment with the axis of rotation of the transmission shafts. Differential input and output shafts of the differential have axes of rotation arranged so as to intersect each other perpendicularly. The axis of rotation of the differential output shaft is placed in alignment with the axis of rotation of the transmission shafts and is connected to the wheel drive shaft. The speed reduction gear means, which is disposed between the transmission shafts and the differential input shaft, has an input gear with an axis of rotation which is placed in parallel with the axis of rotation of the transmission shafts.

The transmission shafts preferably comprise input and output shafts having axes of rotation which are placed in parallel with the engine crankshaft. Either one of the transmission shafts comprises a hollow shaft so as to permit the drive shaft to pass therethrough in a coaxial arrangement. The speed reduction gear means may be connected to either the input shaft or the output shaft of the transmission.

A center differential, such as one comprising a planetary gear set, is provided so as to place an input axis in alignment with the one of the input and output shafts of the transmission.

BRIEF DESCRIPTION OF THE DRAWINGS

The above and other objects and features of the present invention will be apparent to those skilled in the art from the following detailed description of preferred embodiments thereof when considered in conjunction with the accompanying drawings, wherein similar reference numerals have been used to designate the same or similar elements throughout the drawings, and in which.

DETAILED DESCRIPTION OF THE PREFERRED EMBODIMENTS

Figure 1:
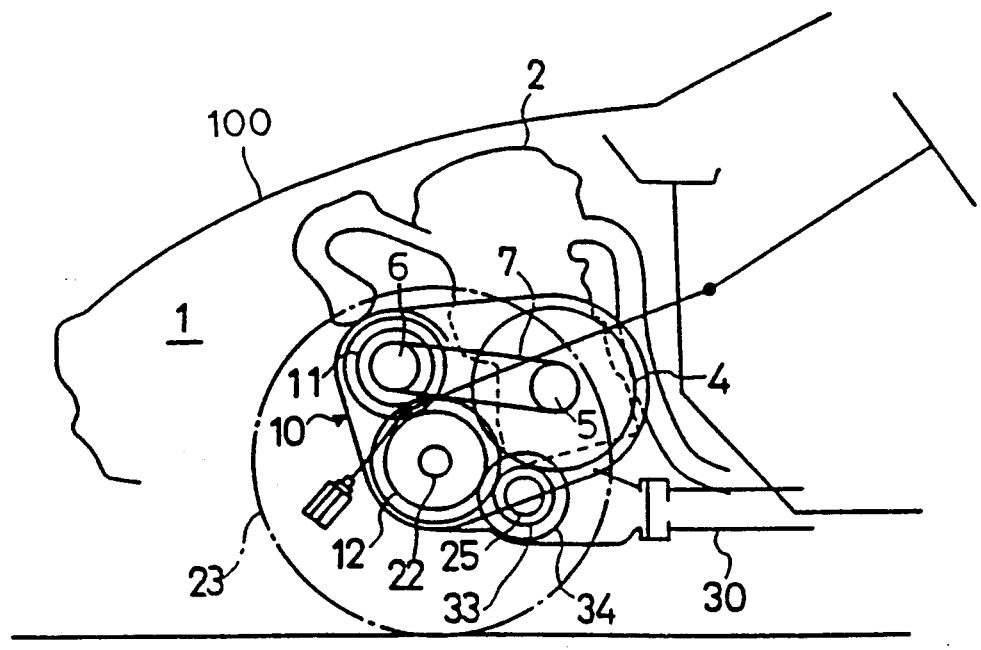
FIG. 1 is a schematic side view showing power trains in accordance with a preferred embodiment of the present invention.
Figure 2:
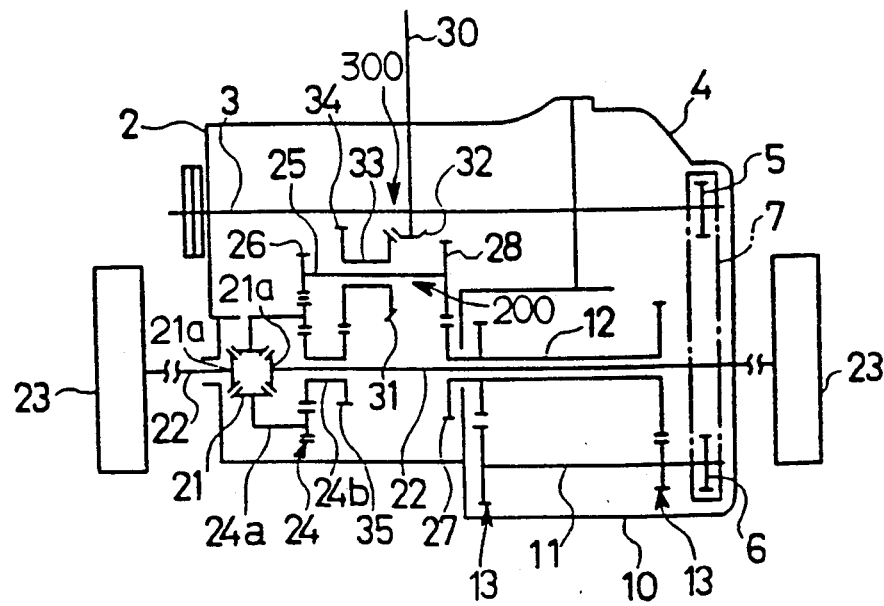
FIG. 2 is a skeleton diagram of the power train of FIG. 1.

Referring to the drawings in detail and, in particular, to FIGS. 1 and 2, a front part of a car body of an automotive vehicle 100, such as a four wheel drive vehicle, having a power train in accordance with a preferred embodiment of the present invention, is shown. An engine 2 is placed in an engine room 1 of the vehicle car body 100 with an output shaft 3, such as a crankshaft, extending in a transverse direction of the car body 100. A transmission 10 is disposed in front of the engine 2 in the engine room 1 so as to have its solid input shaft 11 oriented parallel to the engine output shaft 3.

An input pulley 6 is secured to the transmission input shaft 11 of the transmission 10. The input pulley 6 of the transmission input shaft 11 is connected or coupled to the output pulley 5 of the engine output shaft 3 by a belt or chain 7, which transmits the engine output to drive the transmission input shaft 11. Clutch means 4 is disposed on the engine output shaft 3 so that the engine output, transmitted from the engine output shaft 3, is connected to or cut off from the output pulley 5.

Transmission 10 is of the type having, for instance, two parallel shafts, such as the transmission input shaft 11 and a transmission output shaft 12, which is formed as a hollow cylinder. The transmission input shaft 11 is offset upward, with respect to the transmission case in which it is mounted, relative to the hollow transmission output shaft 12.

The transmission input shaft 11 and the transmission output shaft 12 are provided with a plurality of shift gear sets 1 3, each of which comprises a pair of gears 13a and 13b, different in diameter. Although only two sets of shift gears are shown in FIG. 2 for clear illustration, the number of gear sets actually provided on the transmission shafts 11 and 12 is equal to the number of shiftable speeds, including reverse. These gear sets 13 are selectively used to operationally couple the transmission shafts 11 and 12 so as to shift speeds.

A front wheel drive shaft 22 is disposed coaxially with the transmission output shaft 12. The front wheel drive shaft 22 is coaxially provided with a center differential 24 and a front differential 21, arranged side by side with the center differential, in order from the transmission 10. The front wheel drive shaft 22 is divided into two parts; one part of the front wheel drive shaft 22 is connected at an outer end to one of front wheels 23 passing through the hollow transmission output shaft 12 and at an inner end to a side gear 21a of the front differential 21, and the other part is connected at an outer end to the other front wheel 23 and at an inner end to a side gear 21a of the front differential 21.

As will be described later in detail, the center differential 24, which may include a well known planetary gear set, has a front output means 24a and rear output means 24b, with an integral gear 35, coaxially arranged on the front wheel drive shaft 22. The front output means 24a is connected to a casing of the front differential 21. The rear output means 24b of the center differential 24 is operationally coupled to a propeller shaft 30 by rear wheel drive means 300. Rear wheel drive means 300 has a hollow shaft 33, which is mounted for rotation on a rotary shaft 25 of speed reduction gear means 200. Speed reduction gear means 200 is disposed in parallel with the transmission output shaft 12 and the front wheel drive shaft 22, and below a horizontal plane in which the transmission output shaft 12 is located. Also, speed reduction gear means 200 is located on one side of transmission output shaft 12 opposite to a side where the transmission input shaft 11 is placed. The rear wheel drive means 33 comprises an idle gear 34 and a bevel gear 31, formed integrally, which are in mesh with the integral gear 35 of the rear output means 24b of the center differential 24 and a bevel gear 32 secured to the propeller shaft 30, respectively.

Transmission output from the output shaft 12 of the transmission 10 is reduced by speed reduction gear means 200 and is transmitted to the center differential 24. The speed reduction gear means 200, which is disposed between the transmission 10 and the center differential 24, comprises a pair of reduction gears 26 and 28 having different diameters. These reduction gears 26 and 28 are secured to opposite ends of the rotary shaft 25, which serves as a center differential input shaft, and in mesh with an external gear 24c formed on an outer periphery of the center differential 24 and an gear 27 of the transmission output shaft 12, respectively. The transmission output is reduced according to the gear ratio between the reduction gear 26 and the external gear 24c.

Figure 3:
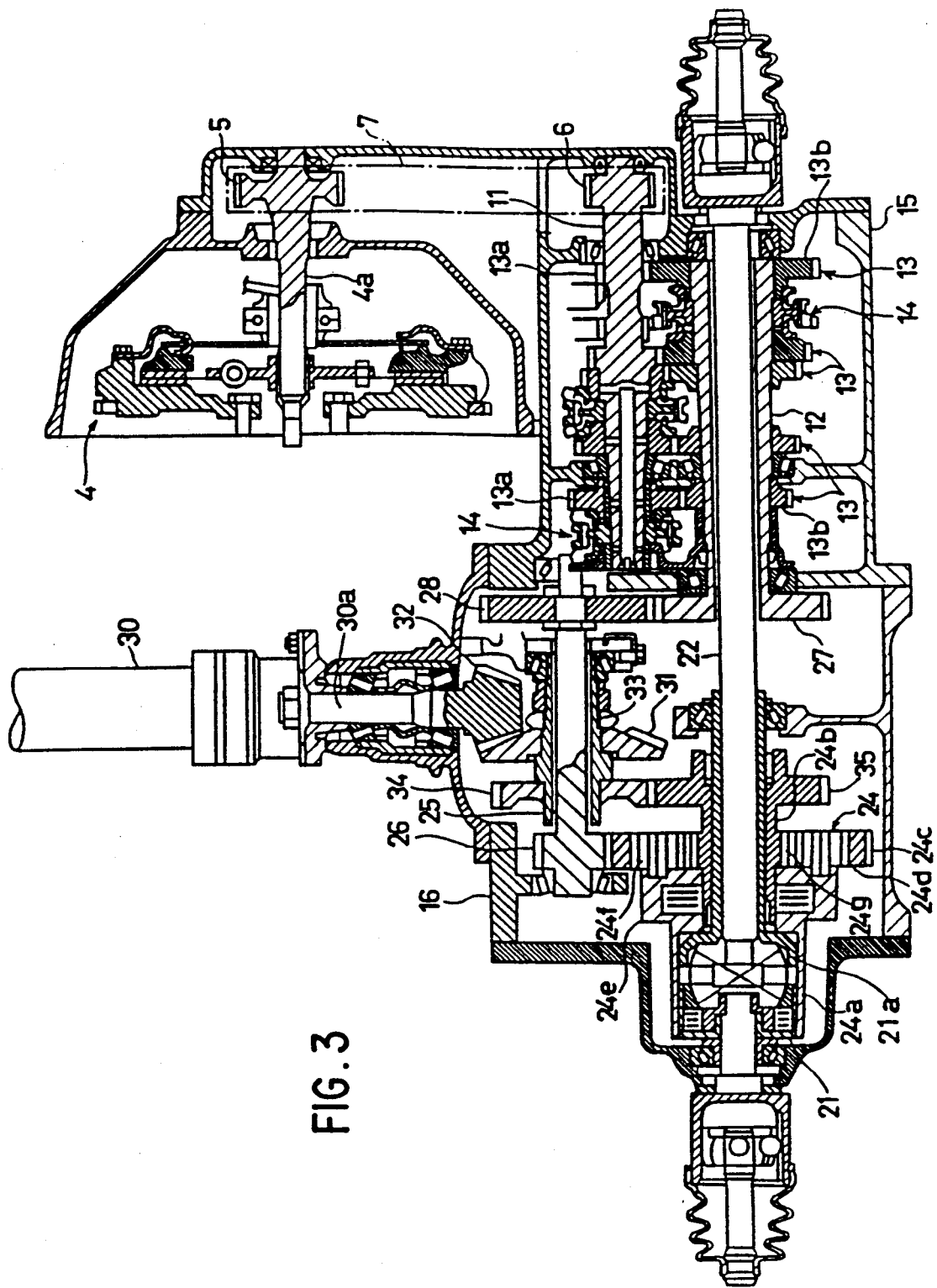
FIG. 3 is a cross-sectional view of the power train of FIG. 1.

Referring to FIG. 3, a practical structure of the power train shown in FIG. 2 is shown in cross section. This structure comprises a transmission casing 15 supporting the input and output shafts 10 and 12 for rotation. The output pulley 5, integral with an output shaft 4a of the clutch means 4, is connected or coupled to the input pulley 6 of the transmission input shaft 11 by a belt 7. Each shift gear set 13 comprises an input gear 13a, mounted on the transmission input shaft 11, and an output gear 13b, mounted on the transmission output shaft 12. A reverse gear set (not shown) has a reverse idler gear in mesh with input and output gears. For one gear to mesh with another quickly and without damage, a "synchronizer" or synchronizing mechanism 14 is provided between the transmission input shaft 11 and the transmission output shaft 12 so as to bring the rotational speed of both gears together. The synchronizing mechanism 14 is operated by moving shift fork, as is well known in the art. By selecting one of the shift gear sets 13, the engine output is transmitted from the transmission input shaft 11 to the transmission output shaft 12 at a ratio set by the selected shift gear set 13.

Hollow transmission output shaft 12, through which the front wheel drive shaft 22 passes, has the gear 27 integrally formed with or secured to its end close to the center differential 24. The center differential 24 has the rotary shaft 25, serving as a center differential input shaft. Rotary shaft 25 is provided, at one end close to the transmission 10, with the gear 28. Gear 28 is secured to an end of the rotary shaft or differential input shaft 25, and meshes with the gear 27 of the transmission output shaft 12. At the other end, remote from the transmission 10, rotary shaft 25 is provided with the reduction gear 26, integrally formed with or otherwise secured to its end. The center differential input shaft 25 is, as was previously described, disposed in parallel with the transmission output shaft 12 and the front wheel drive shaft 22, on the same side of the transmission output shaft 12 as a side where the transmission input shaft 11 is placed, but below a plane wherein both the transmission input shaft 11 and the transmission output shaft 12 are included. The center differential input shaft 20 is supported for rotation by a center differential casing 16.

Center differential 24, mounted on and coaxially with the front wheel drive shaft 22, comprises a planetary gear set having a ring gear 24d with an integral outer gear 24c in mesh with the reduction gear 26, pinion gears 24f held by a carrier 24e, and a sun gear 24g. The center differential 24 divides input thereto so that it passes through the ring gear 24d into two parts. The input is, therefore, distributed to the carrier 24e and the sun gear 24g, respectively.

Carrier 24e is integrally formed with a front cylindrical portion 24a, in which a casing 21a of the front differential 21 is installed. As is well known in the art, the front differential 21 has, in the casing, a pinion and side gears, to which right and left parts of the front wheel drive shafts 22 are connected, respectively.

Sun gear 24g is provided with the rear output shaft 24b mounted for rotation on the front wheel drive shaft 22. The idle means 33, mounted for rotation on the center differential input shaft 25, has the idler gear 34, in mesh 20 with a gear 35 integrally formed with the rear output shaft 24b of the center differential, at one end, and the bevel gear 31, in mesh with the bevel gear 32 of a shaft 30a, joined to the propeller shaft 30.

Figure 4:
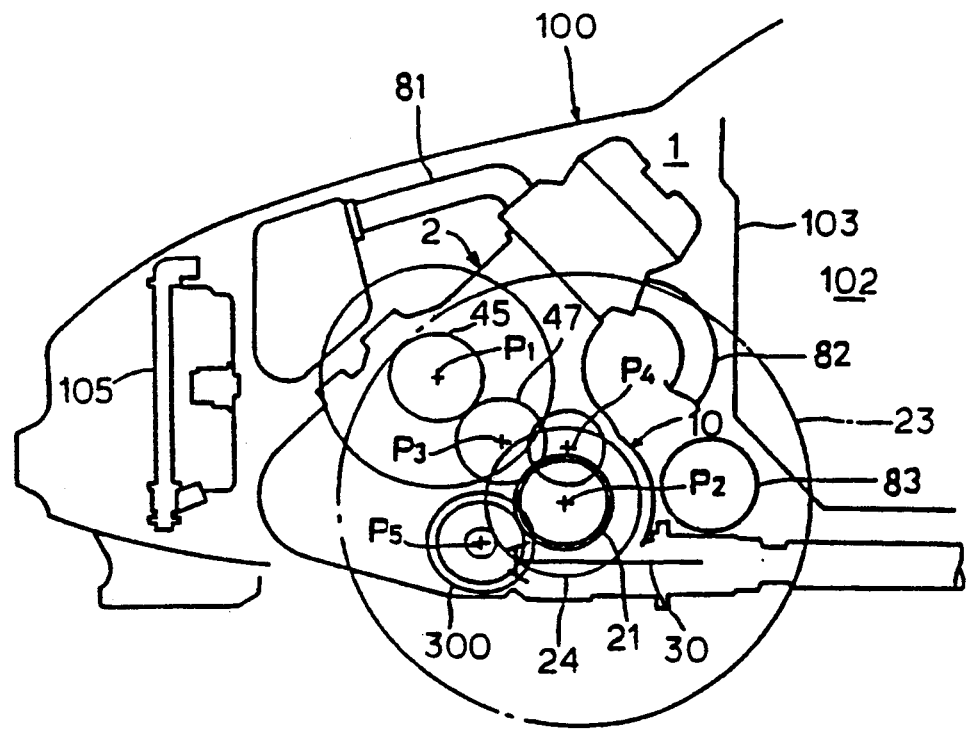
FIG. 4 is a schematic side view showing a power train in accordance with another preferred embodiment of the present invention.
Figure 5:
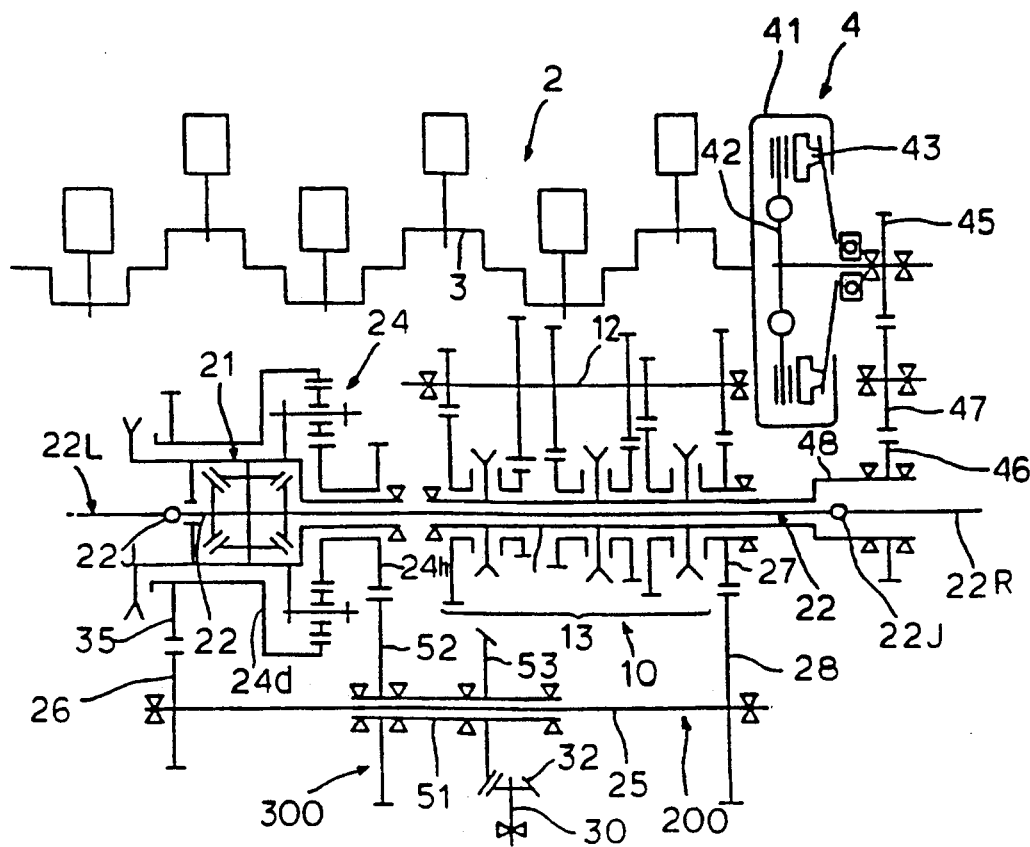
FIG. 5 is a skeleton diagram of the power train of FIG. 4.

Referring to FIGS. 4 and 5, which show a power train in accordance with another preferred embodiment of the present invention, an engine 2 is placed in an engine room 1 of the vehicle car body 100, which is separated from a passenger compartment 102 by a dash board 103. The engine 2 is placed with its output shaft, such as a crankshaft 3, directed in a transverse direction of the vehicle car body 100. A transmission 10 is placed behind the engine 2 in the engine room 1 with its input and output shafts 11 and 12 directed in parallel with the crankshaft 3. A radiator 105, which is of a type well known in the art, is placed in front of the engine 2 in the engine room 1. There are further arranged in the engine room 1 an intake manifold 81, connected to intake ports (not shown) of the engine 2, exhaust pipes 82, connected to exhaust ports (not shown) of the engine 2, and a steering rack 83, extending in the transverse direction of the engine room in front of a lower portion of the dash board 103.

Figure 6:
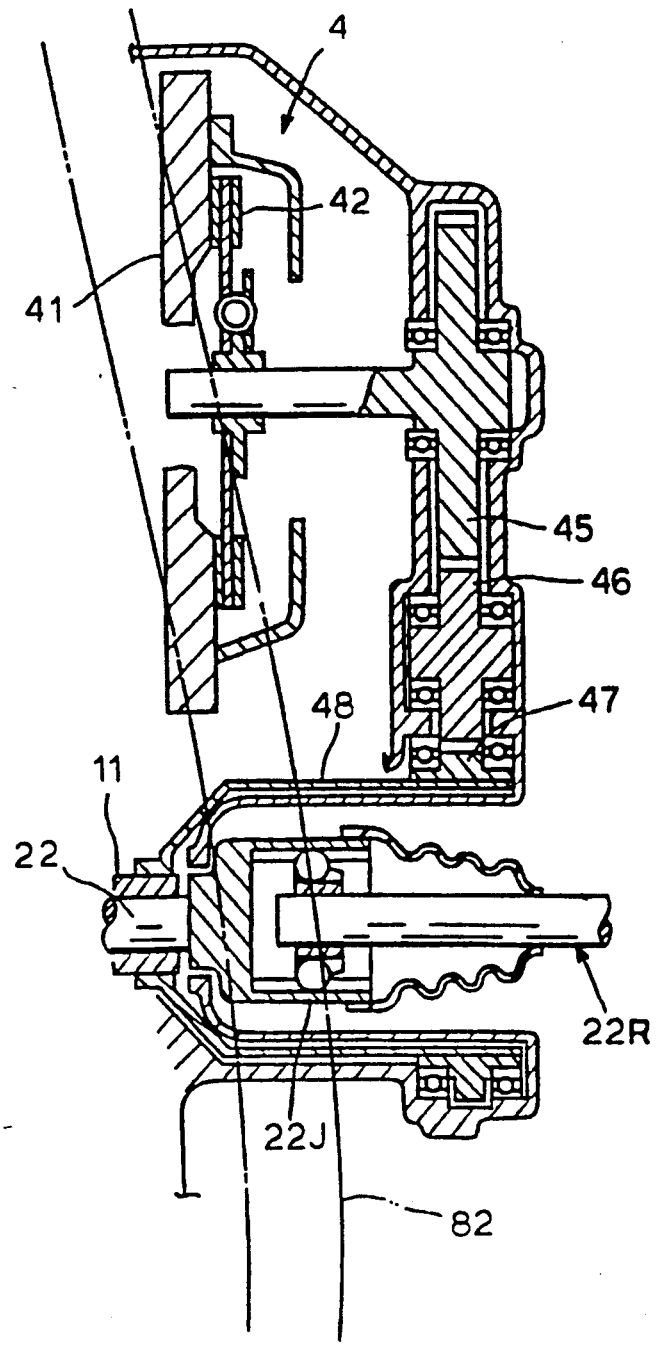
FIG. 6 is a cross-sectional view showing details of the transmission.

The engine 2 is connected or coupled at one end, in the transverse direction, to clutch means 4 for connecting and disconnecting the transmission of engine output from the engine to the transmission 10. As shown in detail in FIG. 6, the clutch means 4 comprises an engine flywheel 41 integral, in operation, with the crankshaft 3, a clutch disk 42, disposed so as to face the flywheel 41, and a pressure plate 43, urging the clutch disk 42 against the flywheel 41. The clutch disk 42 is provided with an integrally formed output or drive gear 45.

An input or driven gear 46 is securely mounted on a cylindrical end member 48, secured to the input shaft 11 of the transmission 10. The input gear 46 of the transmission input shaft 11 is connected or coupled to the output gear 45 of the engine output shaft 3 by an idle gear 47, which transmits the engine output to drive the transmission input shaft 11.

Transmission 10 has two parallel transmission input and output shafts 11 and 12. The transmission output shaft 12, which is a hollow shaft, is coaxially mounted on a front drive shaft 22 for rotation. The transmission input shaft 11 and the transmission output shaft 12 are provided with the same number of shift gear sets 13 as there are shiftable speeds, including reverse. These gear sets 13 are selectively used to operationally couple the transmission shafts 11 and 12 so as to change speeds.

Figure 7:
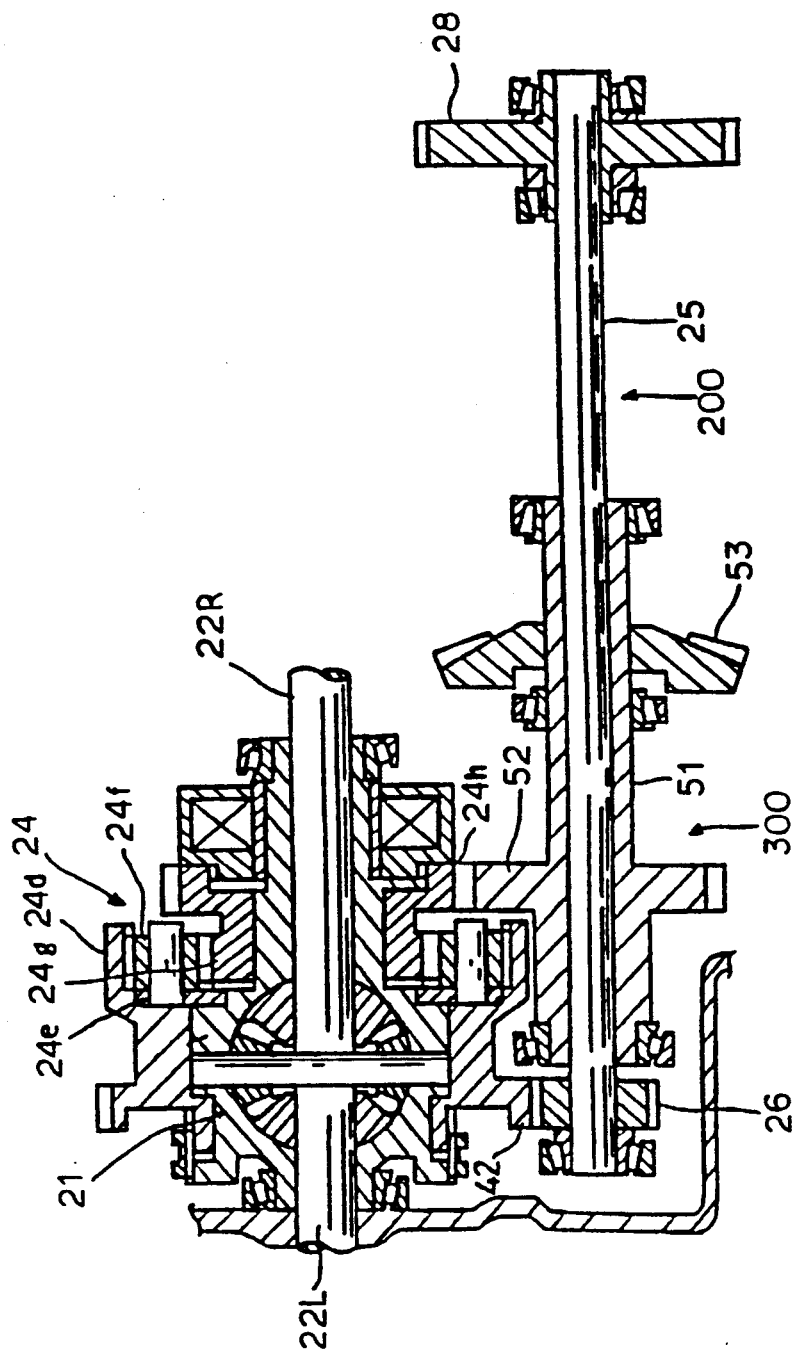
FIG. 7 is a cross-sectional view showing details of a center differential.

As is shown in FIG. 7, a front drive shaft 22 includes a left drive shaft part 22L connected, at an outer end, to one of the front wheels 23, passing through the hollow transmission input shaft 12 and, at an inner end, to the front differential 21, and a right drive shaft part 22R connected, at an outer end, to the other front wheel 23 and, at an inner end, to the front differential 21. Each drive shaft part 22L or 22R is provided with a universal joint 22J. The joint 22J of the left portion of drive shaft part 22L is positioned close to the front differential 21, while the joint 22J of the right portion of drive shaft part 22R is positioned within a cylindrical end member 48 of the transmission input shaft 11, on which the driven gear 46 is secured. The front wheel drive shaft 22 is coaxially provided with a center differential 24 and a front differential 21, arranged in cooperation with each other. The center differential 24 and front differential 2 are the same, in structure and operation, as those of the previous embodiment shown in FIGS. 1-3 and are not presently described. The center differential 24 is operationally coupled to a rear wheel drive means 300, including a propeller shaft 30.

Transmission output from the output shaft 12 of the transmission 10 is reduced, by speed reduction gear means 200, and transmitted to the center differential 24. The reduction gear means 200, which is provided between the transmission 10 and the center differential 24, comprises a large diameter reduction gear 28, in mesh with a output gear 27 secured to the input shaft 11 of the transmission 10, and a small diameter reduction gear 26, in mesh with an input gear 35 secured to a ring gear 24d of the center differential 24. These reduction gears 26 and 28 are, respectively, secured to opposite ends of a rotary shaft 25 on which the rear wheel drive means 300 is mounted for rotation. The rotary shaft 25 is placed in parallel with the shafts of the transmission 10, center differential 24 and front differential 21, and extends beyond the whole lengths of the transmission input and output shafts 11 and 12.

Rear wheel drive means 300 comprises a hollow shaft 51, mounted for rotation on the rotary shaft 25 of the speed reduction gear means 200, a first transmission gear 52, in mesh with an external gear 24h integrally formed with the sun gear 24g of the center differential 24, and a second transmission gear 53, in mesh with a bevel gear 32 secured to the propeller shaft 30.

Referring back to FIG. 4, the power train of the invention is arranged in relation to the transverse engine 2, the transmission 10 and associated parts and mechanisms thereof installed in the engine room 1, of the car body 100. The engine 2 is transversely placed in the engine room 1, with its upper portion, including a cylinder head, inclined rearward. The center axis of rotation P2 of the drive shaft 22, with which the transmission input shaft 11, the center differential 24 and the front differential 21 are coaxially disposed, is placed behind and below the center axis of rotation P1 of the crankshaft 3 of the transverse engine 2. The center axis of rotation P3 of the idle gear 47 is placed between the center axes P1 and P2 The center axis of rotation P4 of the transmission output shaft 12 is placed substantially directly above the center axis of rotation P2 of the drive shaft 22. The center axis of rotation P5 of the rotary shaft 25 of the speed reduction gear means 200 is placed in front of and below the center axis of rotation P2 of the drive shaft 22. The propeller shaft 30 extends horizontally rearward from just below the center axis of rotation P5 of the rotary shaft 25 of the speed reduction gear means 200. The joints 22J of the left and right drive shafts 22L and 22R are positioned at the same distance from and on opposite sides of the center axis of the propeller shaft 30 in the transverse direction. The exhaust pipe 82 passes between the cylindrical end member 48 of the transmission input shaft 11 and the steering rack 8 and extends rearward below the steering rack 83.

Figure 8:
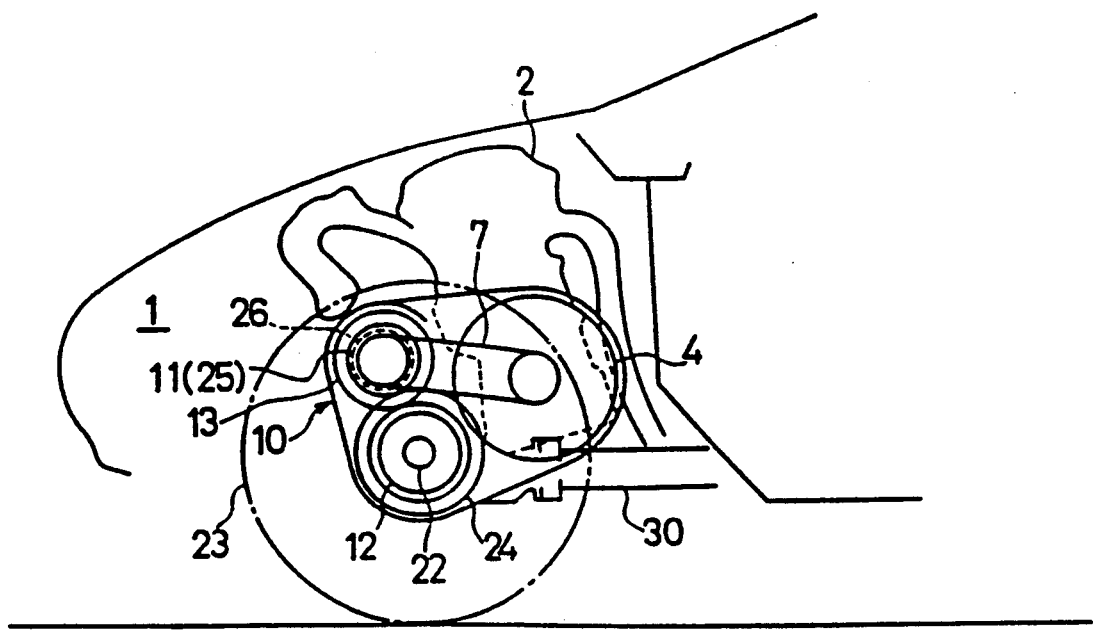
FIG. 8 is a schematic side view showing a power train in accordance with another preferred embodiment of the present invention.
Figure 9:
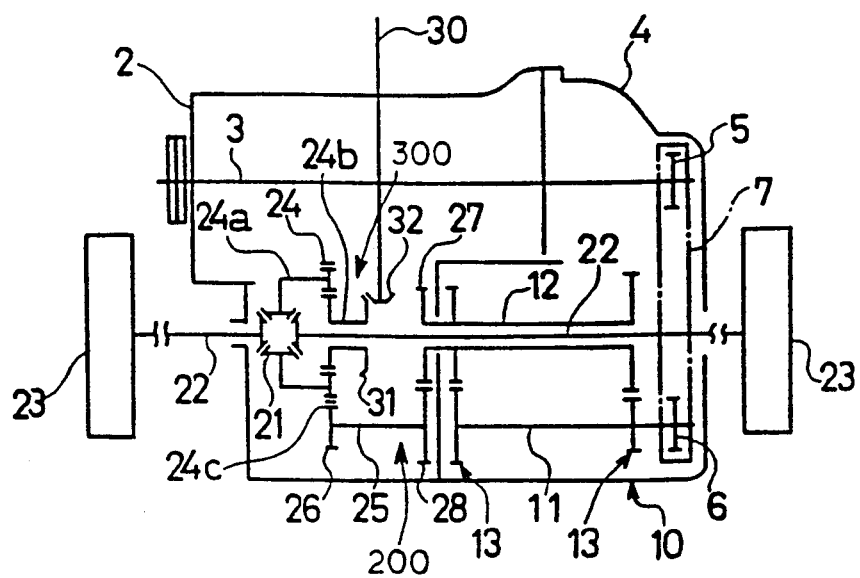
FIG. 9 is a skeleton diagram of the power train of FIG. 8.

Referring to FIGS. 8 and 9, a variant of the power train in accordance with the preferred embodiment of the present invention is shown, which is substantially the same in structure and operation as the power train shown in FIGS. 1 to 3, except in the construction of speed reduction gear means 200.

Speed reduction gear means 200 is disposed between the output shaft 12 of the transmission 10 and the center differential 24. However, in this embodiment, the rotary shaft 25, serving as an input shaft of the center differential 24, is disposed in a straight line extending from the output shaft 11 of the transmission 10.

According to the arrangement of the power train, because the transmission 10 is oriented with its input and output shafts 11 and 12 directed in parallel with the lengthwise direction of the engine 2 mounted transversely on the car body, the power train is made compact in size in the transverse direction. In addition, because the engine 2 is located, as a mid-vehicle engine, behind the front drive shaft 13, the power train, including the engine, can be laid out so as to provide a balanced weight distribution of the car body.

Because, in particular, the front differential 21, the front wheel drive shaft 22 and the center differential 24 are all arranged coaxially with the output shaft 12 of the transmission 10, the transmission 10 and the front differential 21 are laid out snugly in all directions. Furthermore, because reduction gear 26 of the speed reduction gear means 200 is provided on the input shaft 25 of the center differential 24, which is provided separately from the input shaft 12 of the transmission 10, a high degree of freedom is permitted in determining the diameter of the reduction gear 26 and the distance between the output shaft 12 of the transmission 10 and the input shaft 25 of the center differential 24. This allows one to design a power train with a high reduction ratio.

Since the reduction gear 26 is not bulky as compared to the front differential 21, the gear 25, even if provided on another shaft, does not adversely affect the size of the power train, as long as the front differential 21 is arranged coaxially with the output shaft 12 of the transmission 10. When the shaft 25 with the reduction gear 6 is placed on the same side, with respect to the output shaft 12 of the transmission 10, as the side on which the input shaft 11 of the transmission 10 is located, and is aligned coaxially with the input shaft 11 a shown in FIG. 5, the reduction gear 26 nests in a space left beside the transmission 10, and does not occupy space above, below or behind the transmission 10.

Because the power train, shown particularly in FIG. 9, is constituted so as to transmit the engine output to the propeller shaft 30 from the rear output shaft 24b of the center differential 24 through the idler gear 34, suitably placing the output shaft 33, having the idler gear 34, provides a high degree of freedom in laying out the propeller shaft 30, so that the propeller shaft 30 is put at the most desirable location. That is, when locating the rear output shaft 24b of the center differential 24 so as to transmit the engine output directly to the propeller shaft 30 from the center differential 24, as is shown in FIG. 9, the propeller shaft 30 is unavoidably located in a high position with respect to the car body, so that what is called a "tunnel" must be formed so as to rise from a floor of the car body. On the other hand, when the output shaft 33 is located behind and below the output shaft 12 of the transmission 10, as is shown in FIG. 1, the position of the propeller shaft 30 is lowered with respect to the floor of the car body. This arrangement of the output shaft 33 allows the idler gear 34 and the reduction gear 26 to be located coaxially with each other, so that the gears 26 and 34 can be arranged snugly in a small space.

Figure 10:
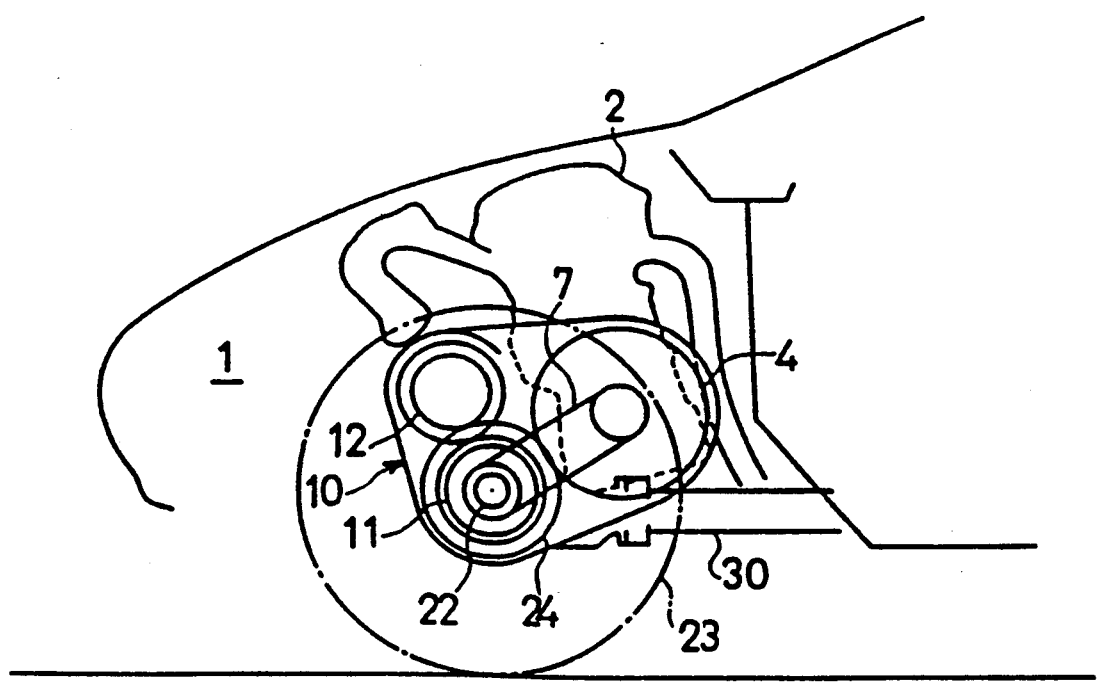
FIG. 10 is a schematic side view showing a power train in accordance with another preferred embodiment of the present invention.
Figure 11:
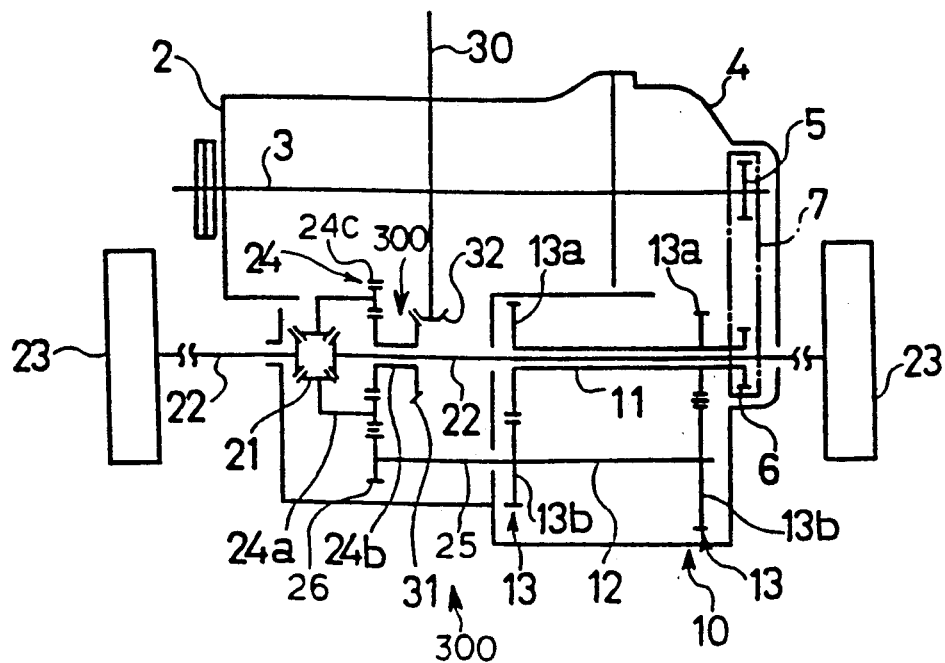
FIG. 11 is a skeleton diagram of the power train of FIG. 10.

Referring to FIGS. 10 and 11, showing a power train in accordance with another preferred embodiment of the present invention, an engine 2 is placed in an engine room 1 of the vehicle car body 100 with an output shaft 3, such as a crankshaft, extending in a transverse direction of the vehicle car body 10. A transmission 10 is placed in front of the engine 2 in the engine room 1 with its hollow input shaft 11 in parallel with the engine output shaft 2. An input pulley 6 is secured to the input shaft 11 of the transmission 10. The input pulley 6 of the transmission input shaft 11 is connected or coupled to the output pulley 5 of the engine output shaft 3 by a belt or chain 7, which transmits the engine output to drive the transmission input shaft 11. Clutch means 4 is disposed on the engine output shaft 3 so that the engine output, transmitted from the engine output shaft 3, is connected to or cut off from the output pulley 5.

Transmission 10 is of the type having, for instance, two parallel shafts, such as the transmission input shaft 11 and a transmission output shaft 12. The transmission output shaft 12 is offset upward, with respect to the transmission case in which it is mounted, relative to the hollow transmission input shaft 11.

The transmission input shaft 11 and the transmission output shaft 12 are provided with a plurality of shift gear sets 13. These gear sets 13 are selectively used to operationally couple the transmission shafts 11 and 12 s as to shift speed.

A drive shaft 22 is disposed coaxially with the transmission output shaft 12. The front wheel drive shaft 22 is coaxially provided with a center differential 24 and a front differential 21 arranged in cooperation with each other. The front wheel drive shaft 22 is divided into two parts. One part of the front wheel drive shaft 22 is connected, at an outer end, to a front wheel 23 passing through the hollow transmission input shaft 12, and at an inner end to the front differential 21. The other part of the front wheel drive shaft is connected, at an outer end, to the other front wheel 23, and at an inner end to the front differential 21.

Center differential 24, comprising the same planetary gear set of the previous embodiment, includes front output means 24a and rear output means 24b, with an integral bevel gear 31, which are coaxially arranged on the front wheel drive shaft 22. The rear output means 24b of the center differential 24 is operationally coupled to a propeller shaft 30 through the engagement between the bevel gear 31 of the rear output means 24b of the center differential 24 and a bevel gear 32 secured to a propeller shaft 30.

Transmission output from the output shaft 12 of the transmission 10 is reduced by speed reduction gear means 200 and is transmitted to the center differential 24. The reduction gear means 200, which is provided between the transmission 10 and the center differential 24, comprises a reduction gear 26 in mesh with an external gear 24c (see FIG. 3) formed on an outer periphery of the center differential 24 and secured coaxially to an extension of the output shaft 12 of the transmission 10. The transmission output is reduced according to the gear ratio between the reduction gear 26 and the external gear 24c of the center differential 24.

Figure 12:
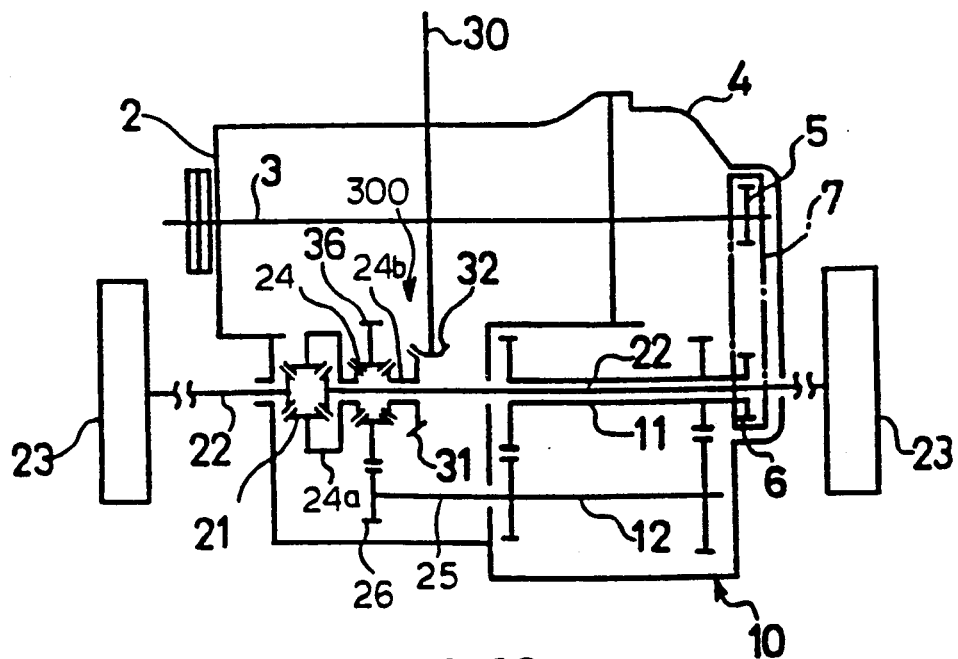
FIG. 12 is a skeleton diagram of a power train in accordance with another preferred embodiment of the present invention.

Referring to FIG. 12, a variant of the power train in accordance with the preferred embodiment of the present invention shown in FIGS. 10 and 11 is shown. This variant has a center differential 24 which is different from the center differential 24 of the power train of FIG. 10 and 11.

The center differential 24, provided coaxially on a front wheel drive shaft 22, is of the type comprising bevel gears having side gears which are connected to output shafts 24a and 24b for the front and rear wheels, respectively. The center differential 24 is provided with a large diameter of input gear 36 having an external thread. The external thread input gear 36 is in mesh with the reduction gear 26, integrally connected to the transmission output shaft 12 so as to constitute reduction gear means.

Utilizing a the bevel gear type of differential as the center differential 24 allows the whole size of the center differential 34 to be smaller in diameter than a planetary gear type of differential, such as the center differential 24 of the previous embodiment shown in FIG. 11. This increases the degree of freedom in designing the speed reduction ratio of the speed reduction gear means 200, which comprises the gears 26 and 36 which are disposed around the center differential 24. In other words, since the transmission input and output shafts 11 and 12 of the transmission 10 have a plurality of shift gear sets 13, mounting a center differential coaxially on the transmission input shaft 11 places a restriction on the distance between the transmission output shaft 12 and the input and/or output shafts of the center differential. However, the bevel gear type center differential 24 in this variant is sufficiently small in diameter to allow gear diameters of the reduction gear 25, connected to the transmission output shaft 12, and of the input gear 36, surrounding the center differential 24, to be adjusted to certain limits within the restricted shaft-to-shaft distance. This provides greater freedom in setting a speed reduction ratio. On the other hand, since, from the view point of length, the planetary type center differential is shorter than the bevel gear type center differential, a power train having the planetary type center differential is more compact in the transverse direction of the vehicle body 100.

Figure 13:
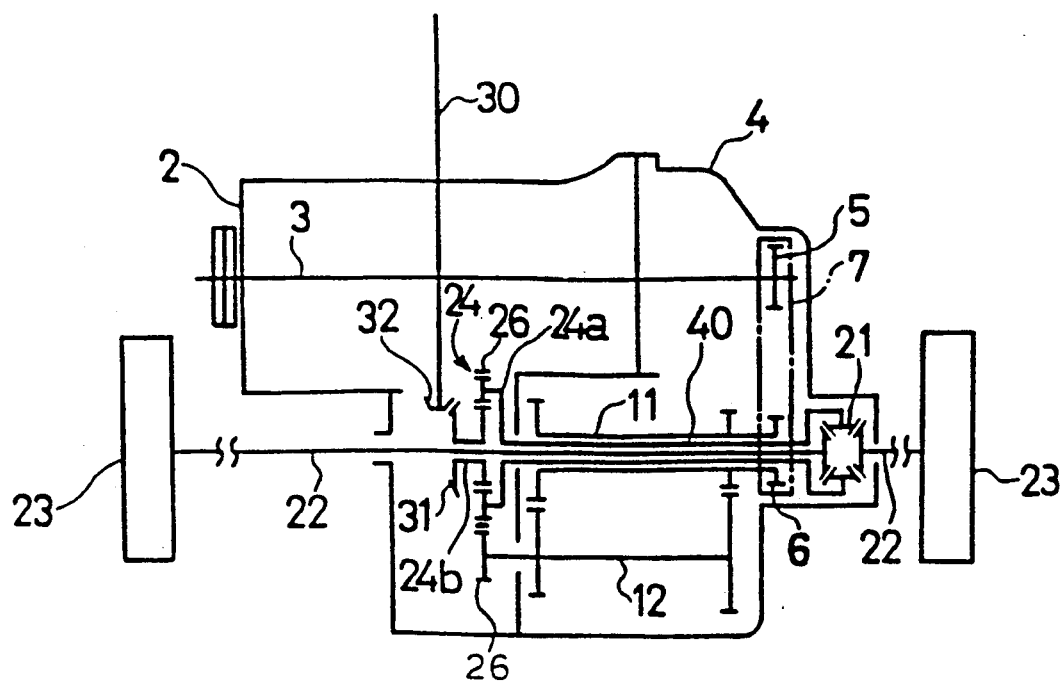
FIG. 13 is a skeleton diagram of a power train in accordance with still another preferred embodiment of the present invention.

Referring to FIG. 13, another variant of the power train in accordance with the preferred embodiment of the present invention illustrated in FIGS. 10 and 11 is shown. In this variant, the front differential 21 and the center differential 24 are disposed on opposite sides of the transmission 10 with respect to the width of vehicle body. The center differential 24 has an output shaft 24a for the front wheels, which is connected to a hollow connecting shaft 40 passing through the hollow input shaft 11. On one side of the transmission, opposite to the side where the center differential 24 is disposed, the front differential 21 is coupled to the hollow connecting shaft 40. The front drive shaft 22 passes through the hollow connecting shaft 40.

The power train of this variant is desirable when placing the front differential 21 and the center differential 24 on opposite sides of the transmission, since it permits lengthwise balance of the drive shaft 22.

In a power train in which the transmission has the input and output shafts directed in the lengthwise direction of the crankshaft of the engine 2, mounted in the engine room transversely with respect to the car body, because the center differential, front differential and the front drive shaft are arranged coaxially with either one of the transmission input and output shafts, the power train, including the transmission and differentials, is made compact in size in all directions, which is advantageous when the engine is to be installed as a mid-vehicle engine in a car. Furthermore, because the speed reduction gear means is associated with the other transmission shaft, the speed reduction gear means itself is made compact in size with a sufficient speed reduction rate, resulting in a compact power train.

It is to be understood that although the present invention has been fully described with respect to preferred embodiments thereof, various other embodiments and variants are possible which fall within the scope and spirit of the present invention, such other embodiments and variants are intended to be covered by the following claims.

What is claimed is:

1. A power train for transmitting engine output, from an engine having a crankshaft, extending in a transverse direction of a vehicle, to drive wheels, said power train comprising:

a transmission, having transmission shafts with axes of rotation parallel to said crankshaft;

a wheel drive shaft connected to each drive wheel, an axis of rotation of said wheel drive shaft being aligned with said axes of rotation of said transmission shafts;

first differential means, having first differential input and output shafts with axes of rotation which intersect each other perpendicularly, for differentially driving said drive wheels through said wheel drive shaft, an axis of rotation of the first differential output shaft being in alignment with at least one of said axes of rotation of said transmission shafts and being connected to said wheel drive shaft;

second differential means for differentially driving each wheel drive shaft, an axis of rotation of second differential input and output shafts of the second differential means being in alignment with said at least one of said axes of rotation of said transmission shafts; and speed reduction gear means, disposed between said transmission shafts and the second differential input shaft, for reducing a speed of rotation of said second differential input shaft in relation to a speed of rotation of said transmission shafts, said speed reduction gear means and having an input gear, having an axis of rotation which is placed parallel to said axes of rotation of said transmission shafts.

2. A power train as recited in claim 1, wherein said transmission shafts comprise input and output shafts having axes of rotation placed in parallel with said crankshaft and axes of rotation of said wheel drive shaft, and which said first and second differential output shaft are placed in alignment with an axis of rotation of one of the input and output shafts of said transmission.

3. A power train as recited in claim 2, wherein said one of said input and output shafts of said transmission comprises a hollow shaft through which said wheel drive shaft passes.

4. A power train as recited in claim 2, wherein said speed reduction gear means is connected to said one of said input and output shafts of said transmission.

5. A power train as recited in claim 4, wherein the axis of rotation of said input gear is parallel with the axes of rotation of said input and output shafts of said transmission.

6. A power train as recited in claim 5, wherein said speed reduction gear means is connected to the output shaft of said transmission.

7. A power train as recited in claim 5, wherein said speed reduction gear means is integrally coupled to the input shaft of said transmission.

8. A power train as recited in claim 4, wherein the axis of rotation of said input gear is placed in alignment with an axis of rotation of the other of said input and output shafts of said transmission.

9. A power train as recited in claim 8, wherein said speed reduction gear means is connected to the output shaft of said transmission.

10. A power train as recited in claim 8, wherein said speed reduction gear means is connected to the input shaft of said transmission.

11. A power train as recited in claim 2, wherein said speed reduction gear means is connected to the other of said input and output shafts of said transmission.

12. A power train as recited in claim 11, wherein said speed reduction gear means is integrally coupled to the output shaft of said transmission.

13. A power train as recited in claim 12, wherein said axis of rotation of said input gear is placed in alignment with an axis of rotation of an input shaft of said transmission.

14. A power train as recited in claim 2, further comprising said second differential having an input axis placed in alignment with said one of said input and output shafts of said transmission.

15. A power train as recited in claim 14, wherein said second differential comprises a planetary gear set.

16. A power train as recited in claim 14, further comprising wheel drive means, for driving wheels, disposed between said second differential and a propeller shaft operationally connecting said second differential to driven wheels, said wheel drive means including two bevel gears having axes of rotation which intersect at a right angle.

17. A power train as recited in claim 16, wherein one bevel gear is placed in alignment with said one of said input and output shafts of said transmission.

18. A power train as recited in claim 17, wherein one bevel gear is placed in alignment with the input shaft of said transmission.

19. A power train as recited in claim 17, wherein one bevel gear is placed in alignment with the output shaft of said transmission.

20. A power train as recited in claim 17, wherein one bevel gear is placed in alignment with said axis of rotation of said input gear of said speed reduction gear means.

21. A power train as recited in claim 14, wherein said speed reduction gear means is disposed between said engine and said transmission in a lengthwise direction of said vehicle.

22. A power train as recited in claim 14, wherein said second differential is disposed between said transmission and said differential means in said transverse direction.

23. A power train as recited in claim 1, wherein said engine is located behind said transmission in a longitudinal direction of the vehicle.

24. A power train as recited in claim 1, wherein said first differential means is a front differential.

25. A power train as recited in claim 1, wherein said engine is inclined forwardly in a longitudinal direction of the vehicle at a predetermined angle.

26. A power train for transmitting engine output, from an engine having a crankshaft, extending in a transverse direction of a vehicle, to drive wheels, said power train comprising:
a transmission, having at least one hollow transmission shaft with axes of rotation parallel to said crankshaft;
a wheel drive shaft connected to each drive wheel, a part of said wheel drive shaft passing through said at least one hollow transmission shaft so as to rotate coaxially with said at least one hollow transmission shaft;
first differential means, having first differential input and output shafts having axes of rotation which intersect each other perpendicularly, for differentially driving said drive wheels through said wheel drive shaft, an axis of rotation of the first differential output shaft being aligned with at least one of said axes of rotation of said at least one hollow transmission shaft and being connected to said wheel drive shaft;
second differential means for differentially driving each wheel drive shaft, an axis of rotation of second input and output shafts of the second differential means being in alignment with said at least one of said axes of rotation of said transmission shafts;
speed reduction gear means, disposed between said at least one hollow transmission shaft and said second differential input shaft, for reducing a speed of rotation of said second differential input shaft in relation to a speed of rotation of said at least one hollow transmission shaft, said speed reduction gear means having an input gear having an axis of rotation parallel to an axis of rotation of said at lest one hollow transmission shaft; and
transmission means, disposed between said crankshaft and said at least one hollow transmission shaft, for transmitting an engine output to said transmission, said transmission means including a cylindrical connecting member secured to one end of said at least one hollow transmission shaft for coupling said transmission means to said at least one hollow transmission shaft.

27. A power train as recited in claim 26, wherein said transmission means is disposed so as to allow an exhaust pipe of said engine to extend rearward from said engine and pass an outer periphery of said cylindrical connecting member.

28. A power train for transmitting engine output, from an engine having a crankshaft, extending in a transverse direction of a vehicle, to drive wheels, said power train comprising:

a transmission, having at least one hollow transmission shaft with an axis of rotation parallel to said crankshaft;

a wheel drive shaft connected to each drive wheel, a part of said wheel drive shaft passing through said at least one hollow transmission shaft so as to rotate coaxially with said at least one hollow transmission shaft, differential means, having differential input and output shafts having axes of rotation which intersect each other perpendicularly, for differentially driving said drive wheels through said wheel drive shaft, an axis of rotation of the differential output shaft being aligned with said axis of rotation of said hollow transmission shaft and being connected to said wheel drive shaft;

speed reduction gear means, disposed between said at least one hollow transmission shaft and said differential input shaft, for reducing a speed of rotation of said differential input shaft in relation to a speed of rotation of said at least one hollow transmission shaft, said speed reduction gear means having an input gear having an axis of rotation parallel with an axis of rotation of said at least one hollow transmission shaft;

transmission means, disposed between said crankshaft and said at least one hollow transmission shaft, for transmitting an engine output to said transmission, said transmission means including a cylindrical connecting member secured to one end of said at least one hollow transmission shaft for coupling said transmission means to said at least one hollow transmission shaft; and a flex joint disposed within said cylindrical connecting member.

* * * * *